3,107,082
CONVERTIBLE VALVE
Charles B. Reynolds, P.O. Box 619, Orange, Calif.
Filed Nov. 8, 1960, Ser. No. 67,999
5 Claims. (Cl. 251—214)

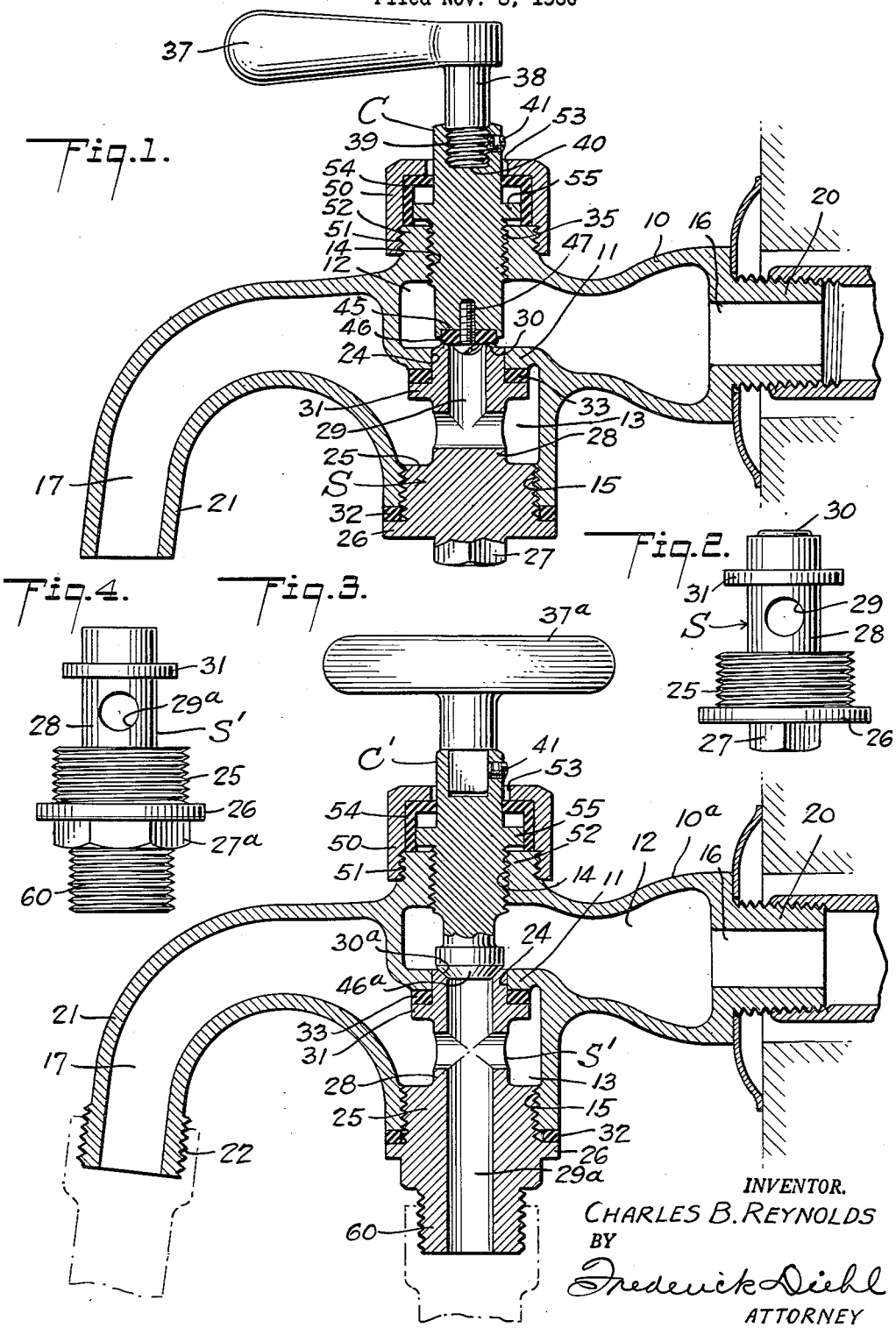

This invention relates generally to valves and more particularly to a flow control device which is structurally characterized to perform various functions in different uses and environments.

This application is a continuation in part of my application entitled Combination Valve and Jet, filed March 6, 1956, Serial No. 569,726 now abandoned.

The primary object of my present invention is to provide a valve structure which is capable of performing various functions by replacing various parts which also enables the useful service life of the valve structure to be greatly extended by replacing working parts when worn, all with the utmost ease and dispatch.

Another object of my invention is to provide a valve structure of the above described character which embodies a seat element which is removably fitted in the body of the valve structure in a manner to enable the seat element to be quickly replaced when worn, so as to greatly prolong the service life of the valve structure.

A further object of my invention is to provide a valve structure in which the replaceable seat element is constructed to form an additional outlet to which conduits of various types can be connected.

A still further object of my invention is to provide a valve structure embodying an operating member for the closure or valving element of the structure which is composed of a handle and an integral stem detachably secured to the closure in a manner to enable the operating member to be readily replaced as a unit when desired.

With these and other objects in view, my invention resides in the combinations, arrangements and functional relationships of element as set forth in the following specification and particularly pointed out in the appended claims.

In the accompanying drawings,

FIGURE 1 is a longitudinal, axial sectional view of the convertible valve embodying my invention and illustrating one form of replaceable seat element and operating member;

FIGURE 2 is a view in side elevation of the seat element shown in FIGURE 1;

FIGURE 3 is a view similar to FIGURE 1 and illustrating a second form of replaceable seat element installed in the valve; and FIGURE 4 is a view in side elevation of the seat element shown in FIGURE 3.

Referring specifically to the drawings, my invention generally comprises a valve structure in the form of a valve body 10 divided internally by a wall or partition 11 into two chambers 12 and 13 provided with alined and screw threaded openings 14 and 15, respectively, and with lateral openings 16 and 17, respectively. In the illustrated embodiment, the lateral opening 16 which constitutes an inlet, is constructed to provide a screw threaded pipe connection to a source of water supply, whereas the lateral opening 17 which constitutes an outlet, is constructed to provide a spout 21. Thus, the valve body 10 has the form of a water faucet as illustrated in FIGURE 1, or a hose bib as shown in FIGURE 3 by the addition of external screw threads 22 to the spout for attaching a garden hose or other conduit to the spout.

The wall 11 is provided with a circular opening 24 in alinement with the openings 14 and 15 for co-action with either of two removably fitted seat elements S and S' shown installed in the valve body in FIGURES 1 and 3, respectively.

The seat element S is constructed to provide a screw threaded plug 25 having a stop flange 26 at one end provided with a tool-engageable portion in the form of a wrench receiving head 27. From the other end of the plug 25 projects a shank 28 of an outside diameter to fit into the opening 24 in the wall 11. The shank 28 is bored or cored longitudinally and transversely to provide a port or passage 29 bounded at the outer end of the shank by an annular valve seat 30 with which a closure or valving element C is adapted to co-act in controlling the flow of water from the chamber 12 to the chamber 13. The shank is further provided with a second stop flange 31, and sealing rings 32 and 33 are provided on the plug 25 and on the shank 28, respectively, for co-action with the stop flanges 26 and 31 in forcing the rings into fluid-tight engagement with the valve body 10 and with the wall 11 when the plug 25 is screwed tightly into the body as shown in FIGURE 1.

The closure C which is generally cylindrical, is screw threaded externally at 35 for co-action with the screw threads in the opening 14 to enable the closure when rotated, to move axially towards and away from the seat 30 by means of an operating member in the form of a lever handle 37. The handle 37 has an integral stem 38 screw threaded at 39 to enable it to be screwed tightly into a screw threaded socket 40 in the outer end of the closure and be locked to the latter by a set screw 41 threaded into the closure and bearing against the stem, all as shown in FIGURE 1.

The inner end of the closure C is provided with a shallow, circular pocket 45 in which a sealing washer 46 providing a valving face, is secured by a headed screw 47 for co-action with the seat 30 in sealing the port 29 fluid-tight when the closure C occupies its closed position. A cup shaped retainer and stop 50 is screw threaded at 51 on a boss 52 formed on the valve body and is provided with a central opening 53 freely receiving the outer end of the closure. A cup shaped packing gland 54 is seated in the retainer 50 and is urged thereby into fluid sealing engagement with the periphery of the closure and with a stop flange 55 on the latter.

From the foregoing description it will be manifest that when the seat 30 of the seat element S has worn to an extent rendering it no longer serviceable, a new element can be substituted with the utmost ease and dispatch upon unscrewing the worn element from the body, and that a new handle 37 or a handle 37a of a different type as shown in FIGURE 3, can be readily applied to the closure upon unscrewing the original handle from the closure.

The valve body 10a shown in FIGURE 3 is identical in construction to the valve body 10 shown in FIGURE 1 with the exception of having its spout provided with the screw threads 22 for connection thereto of the garden hose or other conduit. The seat element S' is removably fitted in the body 10a in the identical manner previously described for the seat element S and differs in construction from the latter only in having a ground and beveled annular seat 30a controlling the port or passage 29a, the longitudinal portion of which is extended through an externally screw threaded nipple 60 projecting from an enlarged wrench-receiving head 27a on the outer end of the element and providing a second outlet to which a garden hose or other conduit may be connected.

The closure element C' shown in FIGURE 3 is identical in construction to the closure element C with the exception that its inner end is provided with a ground beveled valving face 46a for fluid-sealing engagement with the seat 30a when the closure occupies its closed position shown in FIGURE 3.

I claim:

1. A valve of the class described comprising: a valve body having a partition provided with a smooth, circular opening therethrough and dividing said body into an inlet chamber and an outlet chamber provided, respectively, with alined and screw threaded openings in alinement with said partition opening; a replaceable seat element having a plug-forming portion screw threaded into said outlet chamber opening and provided with a smooth, cylindrical shank slidably fitting into said partition opening and having an annular flange; said shank having a port placing said chambers in communication with each other through said partition opening and being provided with a valve seat bounding said port and facing said inlet chamber; a yieldable sealing ring seating against said flange in fluid-tight engagement with said partition when said seat element is screwed tightly into said outlet chamber opening and said shank moves freely in said partition opening; a cylindrical closure element having an intermediate externally screw threaded portion screwed into said inlet chamber opening to engage or disengage said valve seat according as the closure element is rotated in one direction or the other; said closure element having an annular stop flange; a cup-shaped retainer and stop screw threaded on said body and having a central opening freely receiving the outer end of said closure element; a cup-shaped packing gland seating in the said retainer and having portions urged by the retainer into fluid-sealing engagement with the peripheries of the unthreaded portion and stop flange of said closure element so as to prevent leakage of fluid from the inlet chamber past the closure element in any and all positions of the latter; and an operating member secured to said closure element.

2. A valve of the class described comprising: a valve body having a partition provided with an opening therethrough and dividing said body into an inlet chamber and an outlet chamber provided, respectively, with alined and screw threaded openings in alinement with said partition opening; a replaceable seat element screw threaded in said outlet chamber opening and having a valve seat in said partition opening defining a port placing said chambers in communication with each other through said partition opening; a closure element having an operating member and screw threaded in said inlet chamber opening for axial adjustment when rotated, in controlling the flow of fluid from the inlet chamber to the outlet chamber through said port; said closure element also including a stop flange; a cup-shaped retainer and stop screw threaded on said body and having a central opening receiving the outer end of said closure element; a cup-shaped packing gland seating in the retainer and having portions urged by the retainer into fluid-sealing engagement with the peripheries of said outer end of the closure element and its stop flange for co-action therewith in preventing leakage of fluid from the inlet chamber to the outlet chamber past the closure element in any and all positions of the latter; and an operating member secured to the outer end of the closure element.

3. A valve comprising a body; an inner wall in said body dividing the interior of said body into a first chamber and a second chamber, each of said chambers having an opening therein for permitting the passage of fluid, said wall having an aperture therethrough providing communication between said chambers; an annular valve seat in said aperture in said wall; a valve member, said valve member having sealing end engageable with said valve seat, said valve member extending outwardly through said body in alignment with the axis of said valve seat, and being movable toward and away from said valve seat, said valve member including a cylindrical stem portion and a radially extending flange exteriorly of said body; and a sealing means for said valve member, said sealing means including a substantially cup-shaped member having a circumferential wall, an inner end wall adjacent said body and an outer end wall remote therefrom, said flange sealingly engaging said circumferential wall, said cylindrical portion extending through said outer end wall in sealing relationship therewith, and said inner end wall sealingly engaging said body around said valve member.

4. A valve comprising a body; an inner wall in said body dividing the interior of said body into a first chamber and a second chamber, each of said chambers having an opening therein for permitting the passage of fluid, said wall having an aperture therethrough providing communication between said chambers; an annular valve seat in said aperture in said wall; a valve member, said valve member having sealing end engageable with said valve seat, said valve member extending outwardly through said body in alignment with the axis of said valve seat, and being movable toward and away from said valve seat, said valve member including a cylindrical stem portion and a radially extending flange exteriorly of said body; and a sealing means for said valve member, said sealing means including a cup-shaped member, said member having an outer radial end wall in spaced relationship with said body, a circumferential wall connected to said outer radial end wall, and an inner end wall engaging said body in a sealing relationship therewith, said outer end wall having an axial opening therethrough, said stem extending through said axial opening in a sealing relationship therewith, said flange engaging said circumferential wall in a sealing relationship, and including a substantially cup-shaped rigid cap over said cup-shaped member, said cap extending around said outer and circumferential walls and being adjustably secured to said body.

5. A device as recited in claim 4 including in addition a plug removably extending into said second chamber, said plug having apertures therein for transmitting fluid into said second chamber, and having said valve seat positioned at the inner end thereof, said plug having a first flange sealingly engaging said inner wall, and a second flange sealingly engaging said body.

References Cited in the file of this patent

UNITED STATES PATENTS

| 916,403 | Adamson | Mar. 30, 1909 |
| 1,364,848 | Walsh | Jan. 4, 1921 |
| 1,483,001 | Kurre | Feb. 5, 1925 |
| 3,048,362 | Scarborough | Aug. 7, 1962 |

FOREIGN PATENTS

| 586,854 | France | Apr. 4, 1925 |
| 450,387 | Great Britain | July 16, 1936 |